UNITED STATES PATENT OFFICE 2,396,282

UNSATURATED DINITRO COMPOUNDS AND METHOD OF PREPARATION THEREOF

Edwin M. Nygaard and Thomas T. Noland, Woodbury, N. J., assignors to Socony-Vacuum Oil Company, Incorporated, a corporation of New York No Drawing. Application February 15, 1944, Serial No. 522,520

14 Claims. (Cl. 260—644)

This invention has to do with a new and novel class of chemical compounds, unsaturated dinitro compounds, and has to do also with a novel method for their preparation.

The present invention is predicated upon the discovery of dinitro-olefins characterized by attachment of a nitro group to each carbon atom of an aliphatic olefin group. These olefins may be represented by the following general formula:

I 

wherein R and R' represent hydrogen atoms and the same or different hydrocarbon radicals such as alkyl, aralkyl, cycloalkyl, aryl, alkaryl, etc. Typical of the hydrocarbon radicals are methyl, ethyl, propyl, benzyl, cyclohexyl, phenyl, tolyl, etc.

The present invention is also predicated upon the discovery of a novel method of preparation of the aforesaid dinitro-olefins. This preparation involves treating or reacting a halogen-substituted primary nitroparaffin, represented by general Formula II below, with an aqueous solution of a basic metal compound at a relatively low temperature, followed by separation of the dinitro-olefin so formed from the reaction mixture:

II 

wherein R is as defined hereinabove, and X is a halogen atom.

In the preparation of the aforesaid dinitro-olefins the metal salts of the aforesaid halogen-substituted primary nitro-paraffins are formed. These salts may be characterized as follows:

III 

wherein M represents the hydrogen equivalent of a metal, preferably an alkali metal (sodium, potassium, etc.), X and R are as defined hereinabove.

In the present method a halogen-substituted primary nitro-paraffin (general Formula II) is treated with an aqueous solution of a basic metal compound such as a metal hydroxide, at a relatively low temperature. It has been found that the reaction temperature should be maintained sufficiently low to minimize undesirable side reactions. It has also been found that the reaction temperature necessary for optimum results varies with the particular halogen-substituted nitroparaffin used in this method. For example, reaction temperatures from about 0° C. to about 25° C. are preferred when 1-chloro-1-nitroethane is used. Temperatures greater than about 25° C. appear to favor side reactions with the formation of saturated 1,1-dinitroparaffins. In this same regard, however, temperatures somewhat in excess of 25° C. may be used satisfactorily with 1-chloro-1-nitropropane without undue loss to reaction products other than those sought. Generally, then, it may be said that higher reaction temperatures may be used with those halogen-substituted primary nitroparaffins having a greater number of carbon atoms in the molecule than the ethane derivative referred to above. It is for these reasons then that the reaction temperature is specified herein as a "relatively low temperature."

A variety of procedures may be used in carrying out the present method. For example, the halo-nitro compound, or compounds, may be added to a cold aqueous solution of an alkali metal compound, preferably a hydroxide, and the resulting solution of the corresponding metal salt of the halo-nitro compound may then be warmed until the reaction occurs. Another procedure involves adding an aqueous solution of an alkali metal compound to a halo-nitro compound maintained at a suitable temperature; this represents the preferred procedure. Also, the halo-nitro compound and the aqueous metal compound may be added simultaneously to a reaction vessel maintained at a suitable temperature. It has also been found that inert solvents such as CHCl₃, CCl₄, ether, etc. may be used herein, or an excess of the halo-nitro compound may also be used as a solvent. On completion of the reaction the crude reaction product, obtained by any such procedures as those outlined above, may be fractionated under reduced pressure or taken up in a suitable solvent in order to separate the desired dinitro-olefin.

It has also been found that the reaction should not be carried out in an alcoholic medium inasmuch as halogen-substituted nitroparaffins react with alcoholic metallic hydroxides such that primary saturated dinitroparaffins are formed, (cf.) Wieland, Ber., 52, 904 (1919).

It is believed that the reaction involved in the formation of the unsaturated dinitro compounds contemplated herein may be represented broadly by the following equation:

IV 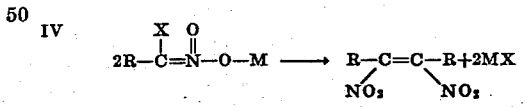

wherein R, X and M are as defined hereinabove.

Similarly, when two different halogen-substituted primary nitroparaffins (general Formula II) are used as the starting materials, an unsymmetrical dinitro-olefin is obtained along with symmetrical olefins of the type shown above in Equation IV, viz.:

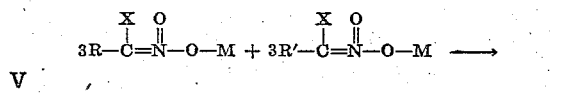

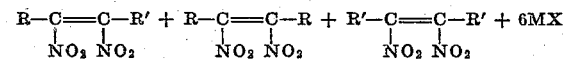

By way of illustration, if a mixture of a halo-nitroethane and a halo-nitropropane, both typified by general Formula II above, are reacted in the present method the products obtained include: 2,3-dinitro-2-butene, 2,3-dinitro-2-pentene and 3,4-dinitro-3-hexene.

While the reaction mechanism involved in the method contemplated herein is not yet completely established, it is suggested by way of speculation, and not by way of limitation, that the reaction mechanism is as outlined hereinbelow. With 1-chloro-1-nitroethane and sodium hydroxide as typical reactants, the reaction may well be represented by Equation VI below:

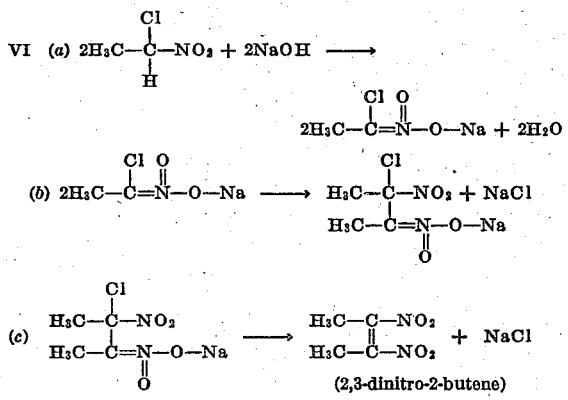

Accordingly, it may also be stated that the dinitro-olefins contemplated herein may be prepared by maintaining a metal salt of a halogen-substituted nitroparaffin represented by the general Formula III:

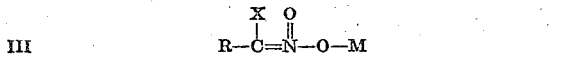

wherein X, M and R are as defined hereinabove, at a relatively low temperature for a sufficient length of time and thereafter separating a dinitro-olefin thus formed from the reaction product.

To more fully explain the methods and the compounds of the present invention, several typical and illustrative examples are detailed below:

EXAMPLE 1

*Preparation of 2,3-dinitro-2-butene*

(a) One mole (109.5 grams) of 1-chloro-1-nitroethane was placed in a 1-liter, three-necked flask equipped with an electrically-driven stirrer, thermometer and dropping funnel. The flask was partially immersed in an ice-water bath. A 10 per cent solution of sodium hydroxide, 400 grams, was added via the dropping funnel over a 1½ hour period. During the addition of the hydroxide solution, the temperature within the flask was maintained at 10-15° C. The reaction mixture, after the addition of the hydroxide solution, was stirred for an additional 30 minutes at the same temperature, after which a light green oil, about 50 grams, was separated therefrom. The oil was washed with cold water, filtered and dried over anhydrous sodium sulfate. The dry oil was fractionated at 1-2 mm. in a modified Podbielniak column. Some unreacted 1-chloro-1-nitroethane was obtained, but the main portion of the product was distilled at 97-100° C. Twenty-six grams of the product, 2,3-dinitro-2-butene were obtained, representing a yield of 35.6% of theory. A portion of the fraction distilling at 97-100° C. at 1-2 mm. was recrystallized twice from absolute alcohol. The pure product obtained thereby was a pale yellow crystalline solid melting at 25.9° C. On analysis the following was noted:

|  | Analysis | Calculated |
|---|---|---|
| Per cent nitrogen | 19.46 | 19.17 |
| Per cent carbon | 33.6 | 32.86 |
| Per cent hydrogen | 4.0 | 4.12 |

(b) Excess of 1-chloro-1-nitroethane:

An excess of 1-chloro-1-nitroethane, 400 grams, was used with the same quantity of aqueous sodium hydroxide as in (a) above. Addition of the hydroxide solution required 2 hours, during which the temperature was kept at 5-15° C. Stirring was continued thereafter for an additional 30 minutes, the temperature being maintained at 5-10° C. The reaction product was washed, filtered and dried as described in (a) and fractionated under vacuum to remove unchanged 1-chloro-1-nitroethane. Ninety-two grams of distillate were obtained. The residue, containing 2,3-dinitro-2-butene, was dissolved in a mixture of absolute alcohol and ether and cooled with dry ice. The product separated as a pale yellow crystalline solid and the crystals were filtered off on a cold Büchner funnel and dried in a desiccator over calcium chloride. Upon standing at room temperature, the crystals melted to a pale yellow liquid which was then heated under vacuum on a hot plate to remove any alcohol or ether occluded therein. In this way 32 grams of dry product were obtained; this represents a yield of 43.8% of theory, based upon 1 mole of sodium hydroxide. A portion of the dry product which was recrystallized from absolute alcohol melted at 28.5-29° C. Analysis of the product indicated the following:

|  | Analysis | Calculated |
|---|---|---|
| Per cent nitrogen | 19.36 | 19.17 |
| Per cent chlorine | 0 | 0 |

(c) Reaction temperature of 50° C. with sodium bicarbonate.

One-half mole (42 grams) of sodium bicarbonate was dissolved in 375 cc. of distilled water and the resulting solution was added dropwise to 0.5 mole (55 grams) of 1-chloro-1-nitro-ethane maintained at 50° C. One hour was required for the addition of the solution, after which a yellow oil separated from the reaction mixture. The oil was removed from the reaction mixture, washed with water, filtered through paper and dried with anhydrous sodium sulfate. Twenty-one grams of oil were thus obtained. The oil was distilled under reduced pressure and the residue containing the product, 2,3-dinitro-2-butene, was recrystallized from absolute alcohol. Only 3.5 grams of the product were obtained; a yield of 4.8% of the theoretical. This would indicate that relatively high reaction temperatures favor side reactions, rather than the desired reaction.

EXAMPLE 2

Preparation of 3,4-dinitro-3-hexene

A 10 per cent solution of sodium hydroxide, 420 grams, was added dropwise to 1 mole (124 grams) of 1-chloro-1-nitropropane maintained at 50° C. over a period of about 3 hours. The reaction mixture was cooled to 20° C. and neutralized with dilute hydrochloric acid. A dark green oil was separated from the reaction mixture, washed with cold water, filtered through paper and dried. Seventy-two grams of dry product were so obtained and were then distilled under reduced pressure. A residue of 17 grams having a boiling range greater than 86° C. at 6 mm. was obtained. On cooling pale yellow crystals separated from the residue and were then recrystallized twice from methyl alcohol. They melt at 32.5–33° C. and are believed to be pure 3,4-dinitro-3-hexene as indicated by the following analysis:

|  | Analysis | Calculated |
|---|---|---|
| Per cent nitrogen | 16.2 | 16.10 |

It will be clear from the foregoing typical examples that the present method is a valuable means for preparing a new class of chemical compounds, namely, dinitro-olefins characterized by attachment of a nitro group to each carbon atom of an aliphatic olefin group (general Formula I). These compounds may be used as intermediates in chemical synthesis and may also be used as ignition improving agents in Diesel type fuels. For example, these compounds react readily with specific organic nitrogen compounds such as ammonia, aniline and pyridine to form another class of new chemical compounds.

It is to be understood, however, that the foregoing illustrative examples are but specific embodiments of the present invention and, therefore, the invention is not to be construed as limited thereto. Rather it is to be broadly considered in the light of the defining language of the appended claims.

We claim:

1. As a new composition of matter, an aliphatic dinitro-olefin characterized by attachment of a nitro group to each carbon atom of an aliphatic olefin group.

2. As a new composition of matter, a compound having the general formula

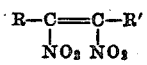

wherein R and R' are selected from the group consisting of a hydrogen atom and an alkyl radical.

3. As a new composition of matter, 2,3-dinitro-2-butene.

4. As a new composition of matter, 3,4-dinitro-3-hexene.

5. As a new composition of matter, 2,3-dinitro-2-pentene.

6. The method of preparation of a dinitro-olefin characterized by attachment of a nitro group to each carbon atom of an aliphatic olefin group, which comprises: treating a halogen-substituted nitroparaffin in an aqueous medium with a basic metal compound at a relatively low temperature, said halogen-substituted nitroparaffin being represented by the general formula

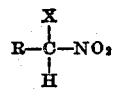

wherein X is a halogen atom and R is selected from the group consisting of a hydrogen atom and a hydrocarbon radical; and separating said dinitro-olefin formed in the initial step from the reaction mixture so formed.

7. The method of preparation of a dinitro-olefin characterized by attachment of a nitro group to each carbon atom of an aliphatic olefin group, which comprises: treating a halogen-substituted nitroparaffin with an aqueous solution of a basic metal compound at a relatively low temperature, said halogen-substituted nitroparaffin being represented by the general formula

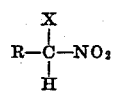

wherein X is a halogen atom and R is selected from the group consisting of a hydrogen atom and a hydrocarbon radical; and separating said dinitro-olefin formed in the initial step, from the reaction mixture so formed.

8. The method of preparation of 2,3-dinitro-2-butene which comprises: treating 1-chloro-1-nitroethane with an aqueous solution of a basic metal compound at a temperature below about 25° C., and separating said 2,3-dinitro-2-butene from the reaction mixture so formed.

9. The method of preparation of 2,3-dinitro-2-butene which comprises: adding an aqueous solution of an alkali hydroxide to 1-chloro-1-nitroethane at a temperature between about 0° C. and about 25° C., and separating said 2,3-dinitro-2-butene from the reaction mixture so formed.

10. The method of preparation of 3,4-dinitro-3-hexene which comprises: adding an aqueous solution of an alkali hydroxide to 1-chloro-1-nitropropane at a temperature below about 50° C., and separating said 3,4-dinitro-3-hexene from the reaction mixture so formed.

11. The method of preparation of a dinitro-olefin represented by the general formula

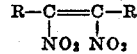

wherein R is selected from the group consisting of a hydrogen atom and a hydrocarbon radical, which comprises: maintaining at least one metal salt of a halogen-substituted nitroparaffin represented by the general formula

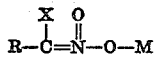

wherein X is a halogen atom, M is a metal and R is selected from the group consisting of a hydrogen atom and a hydrocarbon radical, at a relatively low temperature; and separating said dinitro-olefin formed in the initial step, from the reaction mixture so formed.

12. The method of preparation of a dinitro-olefin represented by the general formula

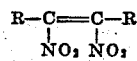

wherein R is selected from the group consisting of a hydrogen atom and a hydrocarbon radical, which comprises: maintaining at least one alkali metal salt of a chlorine-substituted nitroparaffin represented by the general formula $$R-\underset{\underset{}{|}}{\overset{Cl}{C}}=\underset{}{\overset{O}{\overset{\|}{N}}}-O-M$$

wherein M is an alkali metal and R is selected from the group consisting of a hydrogen atom and a hydrocarbon radical, at a relatively low temperature; and separating said dinitro-olefin formed in the initial step, from the reaction mixture so formed.

13. The method of preparation of a dinitro-olefin characterized by attachment of a nitro group to each carbon atom of an aliphatic olefin group, which comprises: treating a halogen-substituted nitroparaffin with an aqueous solution of a basic metal compound at a relatively low temperature, said halogen-substituted nitroparaffin being represented by the general formula $$R-\underset{\underset{H}{|}}{\overset{\overset{X}{|}}{C}}-NO_2$$

wherein X is a halogen atom and R is a hydrocarbon radical; and separating said dinitro-olefin formed in the initial step, from the reaction mixture so formed.

14. The method of preparation of a dinitro-olefin characterized by attachment of a nitro group to each carbon atom of an aliphatic olefin group, which comprises: treating a halogen-substituted nitroparaffin with an aqueous solution of an alkali hydroxide at a relatively low temperature, said halogen-substituted nitroparaffin being represented by the general formula $$R-\underset{\underset{H}{|}}{\overset{\overset{X}{|}}{C}}-NO_2$$

wherein X is a halogen atom and R is selected from the group consisting of a hydrogen atom and a hydrocarbon radical; and separating said dinitro-olefin formed in the initial step, from the reaction mixture so formed.

EDWIN M. NYGAARD.
THOMAS T. NOLAND.